United States Patent [19]

Murakami et al.

[11] Patent Number: 4,831,466
[45] Date of Patent: May 16, 1989

[54] MAGNETIC TAPE RECORDING SIGNAL LEVEL ADJUSTMENT DEVICE

[75] Inventors: Shoji Murakami, Hino; Kiichiro Koide, Tokyo; Kyoichi Inoue, Kodaira; Satoshi Hiranuma, Urawa; Toshihiko Osada, Tokyo, all of Japan

[73] Assignee: Kabushiki Kaisha Kenwood, Tokyo, Japan

[21] Appl. No.: 78,171

[22] Filed: Jul. 27, 1987

[30] Foreign Application Priority Data

| Jul. 30, 1986 | [JP] | Japan | 61-177680 |
| Jul. 30, 1986 | [JP] | Japan | 61-177681 |
| Jul. 30, 1986 | [JP] | Japan | 61-115946[U] |
| Jul. 30, 1986 | [JP] | Japan | 61-115947[U] |
| Jul. 7, 1987 | [JP] | Japan | 62-169441 |

[51] Int. Cl.$^4$ .......................... G11B 27/36; G11B 5/02
[52] U.S. Cl. .......................................... 360/67; 360/31
[58] Field of Search .................. 369/59, 84, 85, 14, 369/15, 58, 174; 360/32, 46, 67, 15, 68, 25, 31

[56] References Cited

U.S. PATENT DOCUMENTS

| 3,501,585 | 3/1970 | De Lange | 360/67 |
| 4,258,397 | 3/1981 | Kitamura et al. | 360/25 |

FOREIGN PATENT DOCUMENTS 55-159344  5/1982  Japan ................................. 360/67

Primary Examiner—Alan Faber
Assistant Examiner—Kevin J. Fournier
Attorney, Agent, or Firm—Gerald J. Ferguson, Jr.

[57] ABSTRACT

A magnetic tape recording signal level automatic adjustment device includes: a reproduced signal level attenuator responsive to an attenuation changeover instruction for attenuating the level of a reproduced signal from a PCM audio signal reproduction device by a predetermined quantity; and an attenuation controller responsive to a sampling instruction for comparing the reproduced signal level with a reference value and outputting the attenuation changeover instruction when the reproduced signal level exceeds the reference value.

21 Claims, 16 Drawing Sheets

FIG. 3A  S3  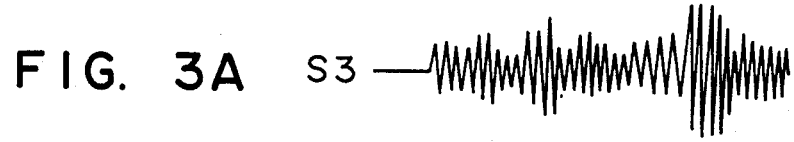
FIG. 3B  S4  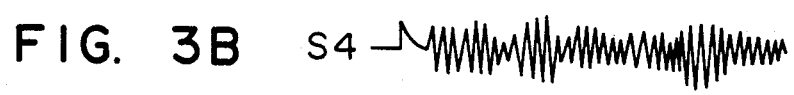
FIG. 3C  S5  
FIG. 3D  S6  

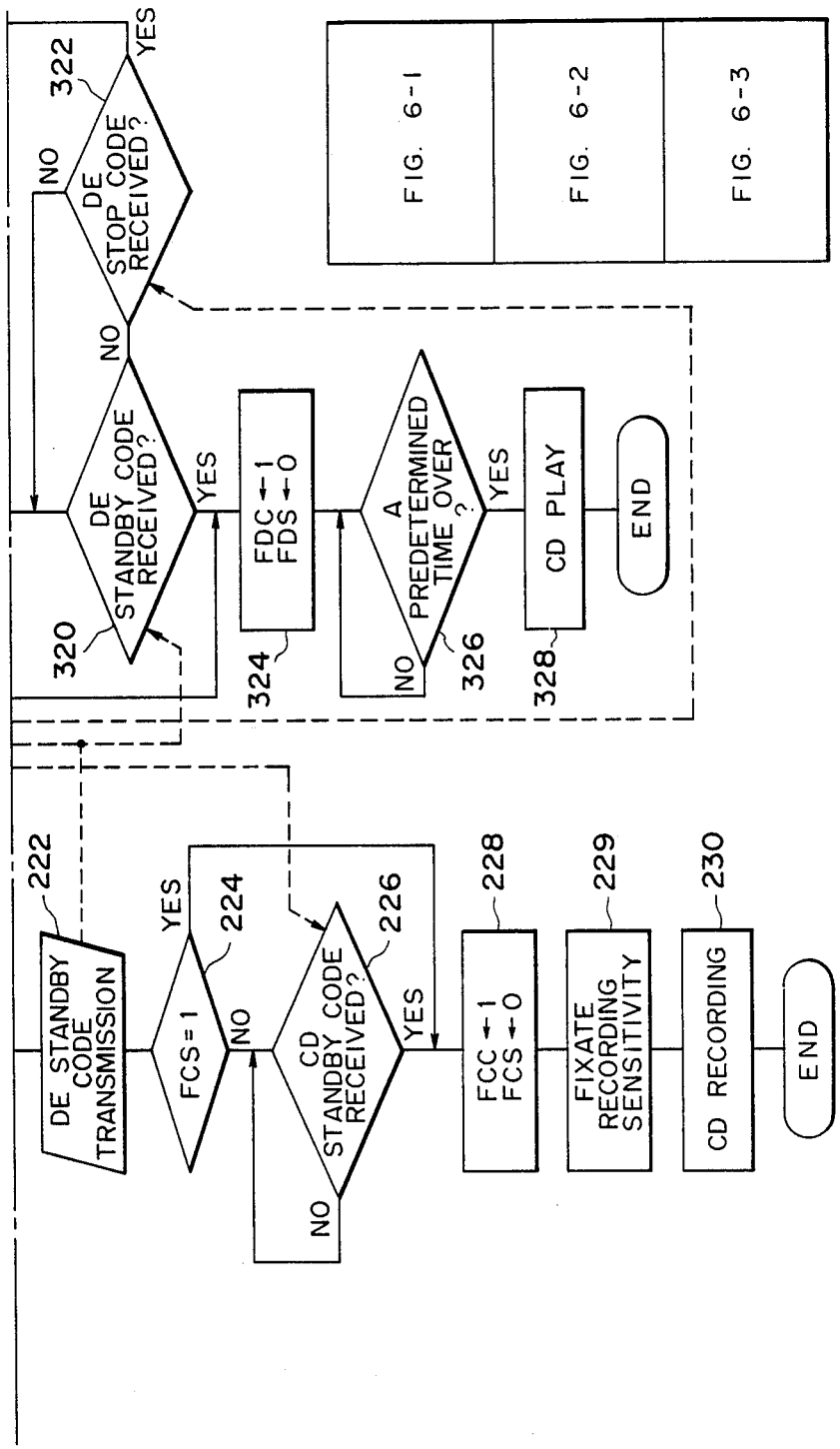

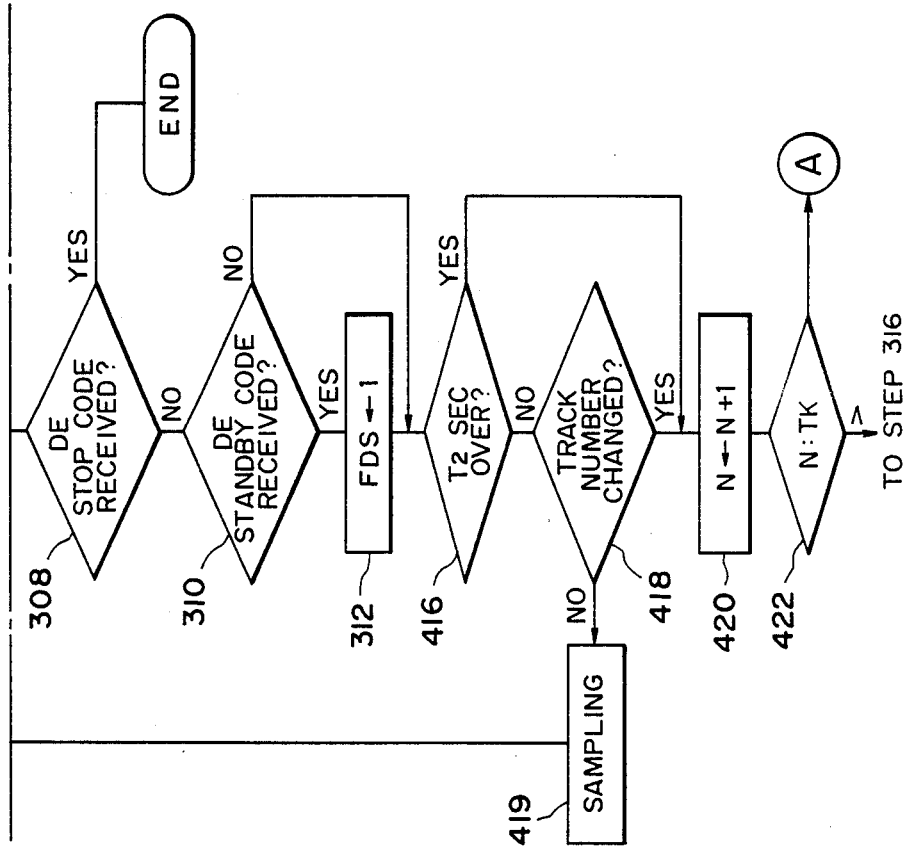
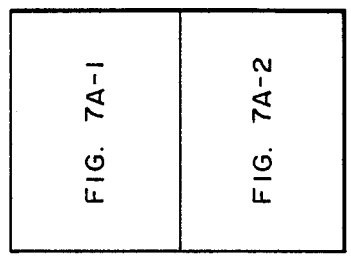
FIG. 7A-2
FIG. 7A

MAGNETIC TAPE RECORDING SIGNAL LEVEL ADJUSTMENT DEVICE

BACKGROUND OF THE INVENTION

1. Field of the Invention

The present invention relates to a magnetic tape recording signal level automatic adjustment device for automatically adjusting the level of reproduced audio analog signals from a PCM audio signal reproduction device such as a compact disk player to thereby optimize the recording of reproduced audio signals.

2. Related Art

If reproduced music signals from a compact disk are recorded on a magnetic tape at an ordinary recording sensitivity, there arise some problems: the recorded music signals are subject to distortion because of a high reproduced signal level at a compact disk player, and conversely because of a low reproduced signal level the recorded music signals have a poor S/N ratio. Such problems result from the following reasons:

(1) The dynamic range of a compact disk is wider than that of a magnetic tape by about 40 dB.

(2) There are large differences between the recording levels of different labels of compact disks: the difference between the maximum peak levels may sometimes be as high as 18 dB. Even in the same level, some music program has a maximum peak level of only $-13$ dB.

To solve such problems, a tape recorder having a conventional automatic level control (ALC) circuit has been used, or the recording level of a tape deck is adjusted to an optimum level prior to recording.

An ALC circuit, however, has been found not satisfactory in that, if a signal indicated by a solid line shown in FIG. 14 is inputted to the ALC circuit, it is attenuated or compressed as shown by the dotted line when it exceeds a certain level so that the original signals are recorded with a low dynamic range and a poor fidelity.

In addition, if an input signal to the ALC circuit has a long attack time, a distortion occurs. In case of a short recovery time, the bleeding phenomenon occurs.

Alternatively, if a manual recording level adjustment method is used, it becomes necessary to adjust the recording level, prior to actual recording, by setting a compact disk player at play and a tape recorder at pause and thereafter, the compact disk player and the tape recorder are stopped to prepare an actual recording.

Such adjustment must be made for all music programs to be recorded due to the above reason (2). Thus, the adjustment becomes quite cumbersome and takes a long time.

SUMMARY OF THE INVENTION

In view of the above problems, it is therefore an object of the present invention to provide a magnetic tape recording signal level automatic adjustment device which can adjust the level of reproduced audio analog signals from a PCM audio signal reproduction device and record the reproduced signals on a magnetic tape without complicated manipulation, without narrowing the dynamic range but recording the original signals with fidelity and little distortion, and improving the S/N ratio.

According to a first aspect of the present invention, the magnetic tape recording signal level automatic adjustment device comprises: reproduced signal level attenuator means responsive to an attenuation changeover instruction for attenuating the level of a reproduced signal from a PCM audio signal reproduction device by a predetermined quantity; and attenuation controller means responsive to a sampling instruction for comparing the reproduced signal level with a reference value and outputting the attenuation changeover instruction when the reproduced signal level exceeds the reference value.

In the above device according to the first aspect of the present invention, first the attenuation quantity of the reproduced signal level attenuator means is initialized to a minimum value and thereafter, a sampling instruction is given to the attenuation controller means.

If the reproduced signal level becomes in excess of the reference value, the attenuation quantity is increased by one step to suppress the reproduced signal level. If the reproduced signal level becomes in excess of the reference value during the succeeding sampling operation, the attenuation quantity is increased by another step to suppress further the reproduced signal level.

Upon release of the sampling instruction, the attenuation quantity at that time is maintained fixed.

Therefore, a maximum value (maximum peak level) of the reproduced signal during the sampling is set substantially at a predetermined level. Therefore, even if there are differences between the recording levels of different labels or programs of a PCM audio signal recording medium, the reproduced signal level can be adjusted automatically and properly by setting an appropriate sampling instruction.

According to a second aspect of the present invention, the magnetic tape recording signal level automatic adjustment method comprises the steps of: sampling the reproduced signal level of a PCM audio signal reproduction device for a time $T_1$ starting from a time $T_2$ before the end or the vicinity of the end of a program recorded on a PCM audio signal recording medium, assuming a maximum value of the sampled, reproduced signal level as a maximum value of reproduced signals during the entire portion of a program to be recorded on a magnetic tape, and adjusting the reproduced signal level such that the maximum value of the reproduced signal level becomes substantially a predetermined value.

In the above method of the second aspect of the present invention, the time $T_1$ is preferably about 60 seconds, and time $T_2$ is about 15 seconds in case of popular music programs on the like other than classical music programs.

Preferably, the number of programs to be sampled from TK programs is TK if TK is smaller than 2 and at least 3 in case that TK is equal or larger than 3. The sampling operation may be performed for each program independently to adjust the reproduced signal level of the program.

It is preferably to sample such a program requiring a minimum access time of a pickup, which reads data recorded in a PCM audio signal recording medium, to the sample start position. The magnitude of the attenuation change step may be zero, i.e., in other words, a linear attenuation change may be employed instead of a stepwise attenuation change.

In classical music programs, there is a good possibility that high level sounds appear particularly at the end of the final movement. According to the present invention, the sampling is further conducted for the final movement of a classic music program which is regarded as the final program recorded in the PCM music recording medium to ensure the more appropriate adjustment for reproduction signal level. In this case, the time $T_1$ is preferably selected to be approximately 17 seconds and the time $T_2$ approximately 15 seconds.

According to a third aspect of the present invention, the audio system comprises: a PCM audio signal reproduction device; signal level automatic adjuster means having reproduced signal level attenuator means responsive to an attenuation changeover instruction for attenuating the level of a reproduced signal from the PCM audio signal reproduction device by a predetermined quantity, and attenuation controller means responsive to a sampling instruction for comparing the reproduced signal level with reference value and outputting the attenuation changeover instruction when the reproduced signal level exceeds the reference value; a tape recorder equipped with recording sensitivity fixing means for setting a recording sensitivity at a predetermined value in response to a fixed recording sensitivity instruction; and system control means responsive to an automatic recording adjustment instruction for outputting the sampling instruction and the fixed recording sensitivity instruction and starting the recording after the reproduced signal level adjustment is completed.

In the above system of the third aspect of the present invention, when a record switch is turned on, an automatic recording adjustment instruction issues. The system control means gives the signal level automatic adjustment means a sampling instruction, and the tape recorder a fixed recording sensitivity instruction.

The attenuation quantity of the reproduced signal level attenuator means is initialized to a minimum value by the signal level automatic adjuster means. The signal level automatic adjuster means operates upon reception of a sampling instruction as in the following:

If the reproduced signal level becomes in excess of the reference value, the attenuation quantity is increased by one step to suppress the reproduced signal level. If the reproduced signal level becomes in excess of the reference value during the succeeding sampling operation, the attenuation quantity is increased by another step to suppress further the reproduced signal level.

Upon release of the sampling instruction, the attenuation quantity at that time is maintained fixed.

Thus, a maximum value of the reproduced signal during the sampling is set substantially at a predetermined level. Therefore, even if there are differences among recording levels in the labels or programs of a PCM audio signal recording medium, the reproduced signal level can be adjusted automatically and properly by setting an appropriate sampling instruction.

Meanwhile, the recording sensitivity of the tape recorder is maintained fixed.

The recording preparation is thus completed to thereafter start the recording.

BRIEF DESCRIPTION OF THE DRAWINGS

FIG. 3 shows waveforms of main signals in the circuit shown in FIG. 2A; FIGS. 6-1 to 6-3 are flow charts illustrating the recording preparation procedure; FIG. 7 shows the arrangement of FIGS. 7A-1 and 7A-2 how the Figures are formed in a single drawing; FIGS. 7A-1 and 7A-2 are flow charts illustrating the sampling procedure.

DETAILED DESCRIPTION OF THE EMBODIMENTS

Figure 8:
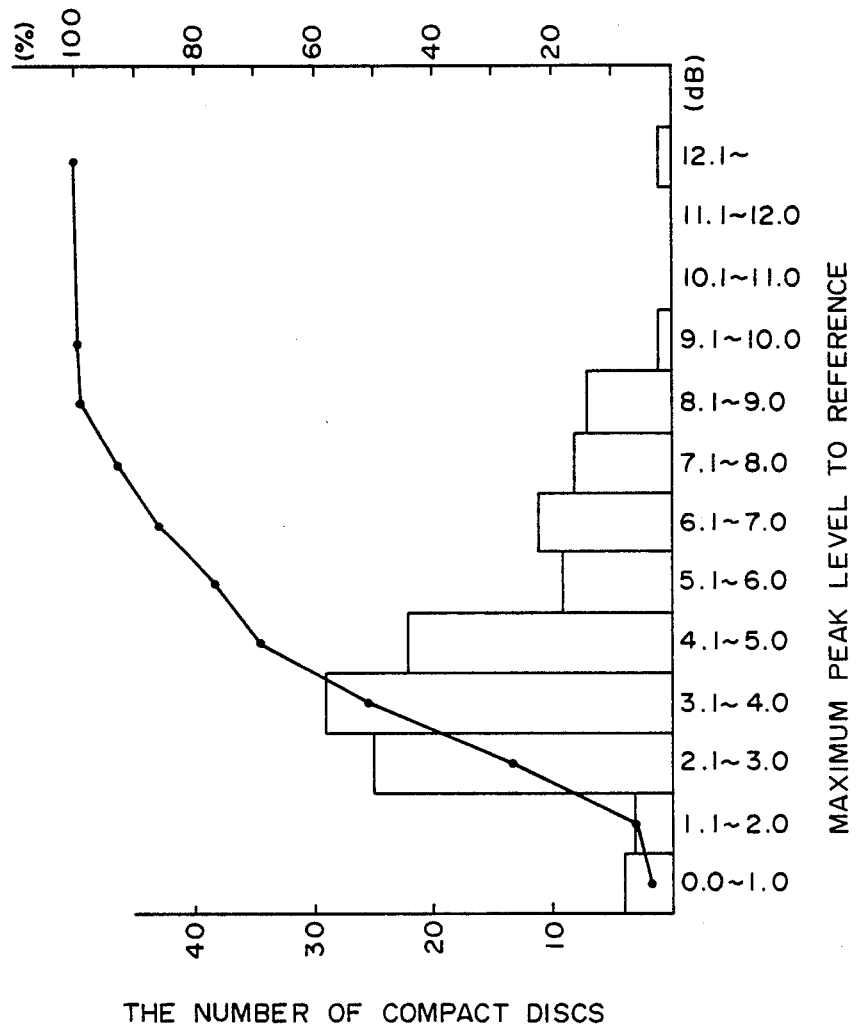
FIGS. 8 to 13 are views used for explaining the statistical analysis of music programs.

The present invention has been made based on the analysis of the following studies. The inventor detected maximum peak levels in the labels of 120 compact disks recording music signals except those for classic music and obtained a distribution graph of maximum peak levels as shown in FIG. 8. The abscissa of the Figure represents a maximum peak level in decibels with a minimum peak level used as a reference.

As seen from FIG. 8, large recording level differences are present for different labels so that the problems stated in the Related Art section still occur even if a recording level at the tape deck is set at the middle of its range. Also, it can be understood from FIG. 8 that proper adjustment can be made within a range of 12 dB.

Now, there arises the problem as to how the reproduced signal level can be adjusted to an optimum value in a short time.

In view of this, using the 120 samples of compact disks, the probabilities were studied as to which part of a program contains a maximum peak level.

Figure 9:
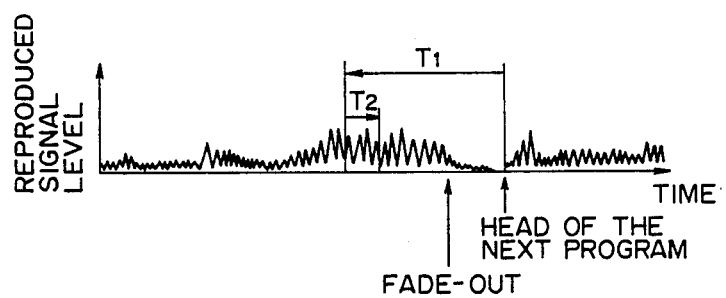

The results showed that the probability of presence of a maximum peak level is very high in the beginning of the fade-out of a program. It was found that a maximum peak level in a program may be picked up if the program is checked by sampling it for a period $T_2$ starting from the time $T_1$ before the program end or the start point of the next program, as shown in FIG. 9. It was also confirmed that even if a maximum peak level is not picked up during the sampling period $T_2$, the peak level within the sampling is substantially equal to that within a program.

Peak levels were statistically analyzed using $T_1$ and $T_2$ as parameters. From the results of the statistical analysis, it was concluded that a maximum peak level can be estimated in short time and with high probability if $T_1$ of about 60 seconds and $T_2$ of about 15 seconds are used.

Next, in case of recording plural programs, there arises another problem of how many programs are to be sampled in order to estimate a maximum peak level among the plural programs in short time and with high probability.

To clarify this, using the 120 samples of compact disks, the inventor sampled N programs starting from the first one in a label to estimate, based on a maximum peak level PLN (Peak Level of N programs), a maximum peak level PLT (Peak Level of Total Programs)

among the total programs in that label. The estimation probability P [%] thus statistically obtained is expressed by the following equation:

P=100× (number of compact disks within 3 dB for decibel differences between PLT and PLN)/120

Figure 10:
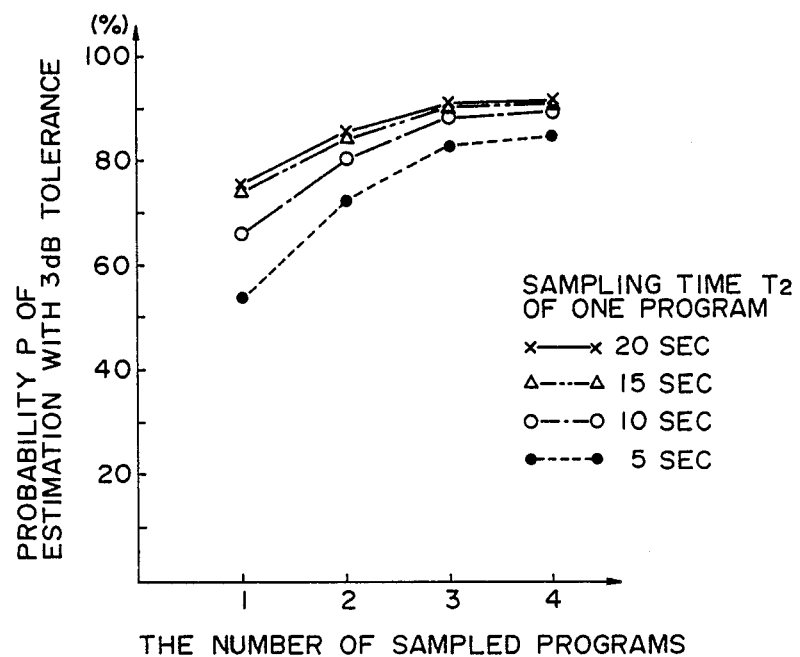

FIG. 10 shows some data of the estimation probability, wherein the abscissa represents the number of sampled programs and the ordinate represents the probability P.

A dotted line, one-dot-chain line, two-dot-chain line and solid line in FIG. 10 show the results using the sampling times $T_2$ for one program, of 5, 10, 15 and 20 seconds, respectively, while using a same time $T_1$ of 60 seconds.

From the above statistical analyses, it was concluded that the number N of sample programs sufficient for the estimation of a maximum peak level in short time and with high probability, is at least 3.

Figure 11:
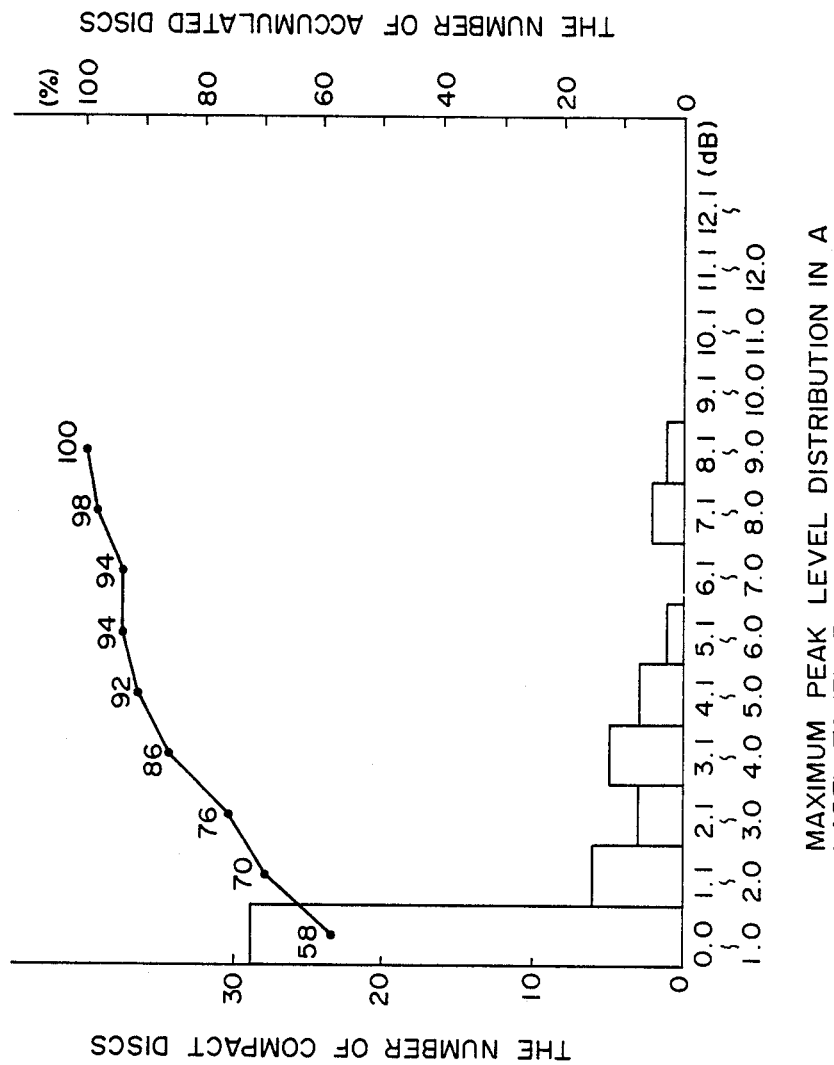

Next, the maximum level in each label was detected for fifty different compact discs which record classical music programs. The distribution of the maximum peak level is shown in FIG. 11. According to the distribution, the recording level differences are large for respective levels and thus even if the recording volume of the tape deck is set at the center point, the problem will take place as previously explained. However, the distribution of FIG. 11 teaches that the recording level adjustment over 9 dB is sufficient. Accordingly, the setting of 12 dB recording level adjustment which is taken for music programs other than classical music programs will satisfy this case.

As another problem, it is important as to how to quickly adjust the reproduction signal level to the an appropriate value. In this sense, the probabilities as to where the maximum peak level takes place in a program were studied for the aforementioned fifty compact discs.

Figure 12:
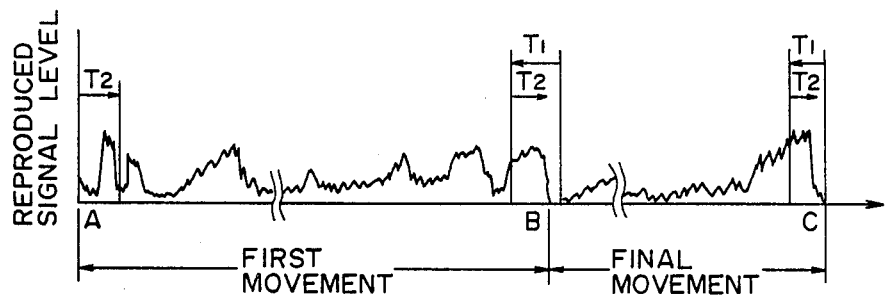

According to our study, the probability that the classical music programs include high level sounds at their final movements was very high. As shown by C in FIG. 12, with a high probability the maximum peak level will be detected when the sampling starts at time $T_1$ before the end of the final movement and continues for time $T_2$.

Even if the maximum peak level in a program is not found out for this sampling interval, it turns out that the maximum peak level in this sampling interval is approximately equal to that in the whole of a program. This conclusion was supported by the satistical analysis, on our study that as tendency, classical programs include high level sounds particularly at three parts, the begining part of the first movement (A in FIG. 12), the end part of the first movement (B in FIG. 12) and the end part of the final movement (C in FIG. 12).

In our study, further samplings were conducted for the above three parts A, B and C by changing the sampling time in addition to the sampling process taken for music programs other than classical music. The resulted statistical probabilities are graphed in FIG. 13.

Figure 13:
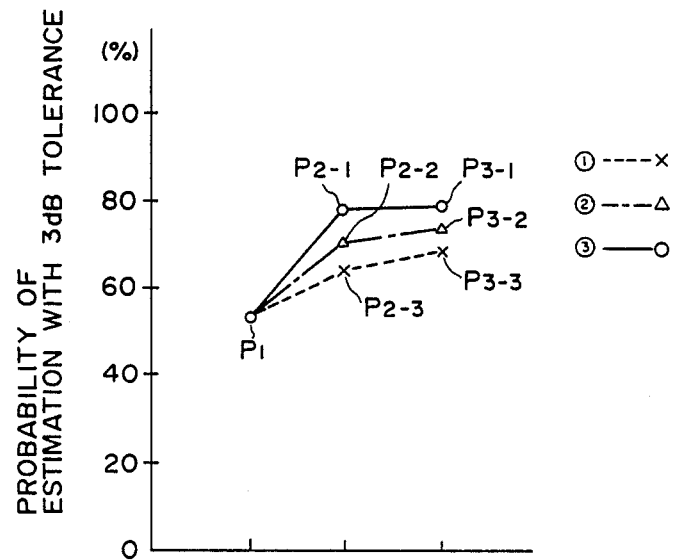
Figure 14:
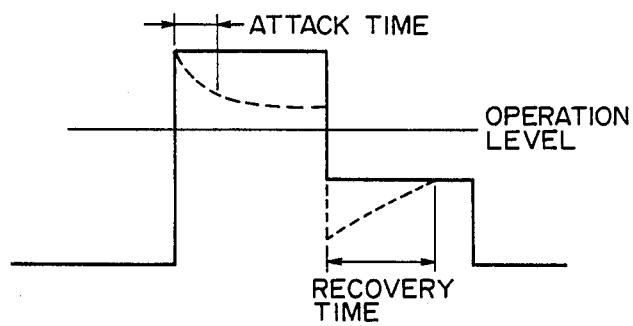
FIG. 14 shows a waveform used for explaining the characteristics of an ALC circuit.

In FIG. 13, dot line curve ① shows probabilities $P_1$, $P_{2-3}$ and $P_{2-1}$ which were obtained through the samplings at the begining part of the first movement (A in FIG. 12), $P_1$ being the results for the primary sampling process taken for music programs other than classical music wherein the samplings are taken for each of three music programs in every disc where $T_1=60$ seconds and $T_2=15$ seconds, $P_{2-3}$ the results for 15 second sampling in addition to the primary sampling process, $P_{3-3}$ the results for 30 second sampling in addition to the primary sampling process.

One-dot chained line curve ② shows probabilities $P_1$, $P_{2-2}$ and $P_{3-2}$ which were obtained through the samplings at the end part of the first movement (B in FIG. 12), $P_1$ being the results for the primary sampling process, $P_{2-2}$ the results for 15 second sampling in addition to the primary sampling process, $P_{3-2}$ the results for 30 second sampling in addition to the primary sampling process.

Real line curve ③ shows probabilities $P_1$, $P_{201}$ and $P_{3-1}$ which were obtained through the samplings at the end part of the final movement (C in FIG. 12), $P_1$ being the results for the primary sampling process, $P_{2-1}$ the results for 15 second sampling in addition to the primary sampling process, $P_{3-2}$ the results for 30 second sampling in addition to the primary sampling process.

In the above further samplings, time $T_1$ was selected to be 2 second longer than time $T_2$ in the consideration of short time no-sound portion at the end of a movement. And also, the first, second and third movements of classic music programs correspond to respective one of the first, second and third programs of musics other than classic. As compared with the probability in the primary sampling process for music, programs other than classical programs, from the obtained probabilities in FIG. 13, we could conclude that the samplings of 15 seconds at the end part of the final movement results in a significantly higher probabilities of the maximum peak level estimation in a shorter sampling time.

[Embodiments]

The preferred embodiments of the present invnetion will be described with reference to the accompanying drawings.

Audio System

Figure 4:
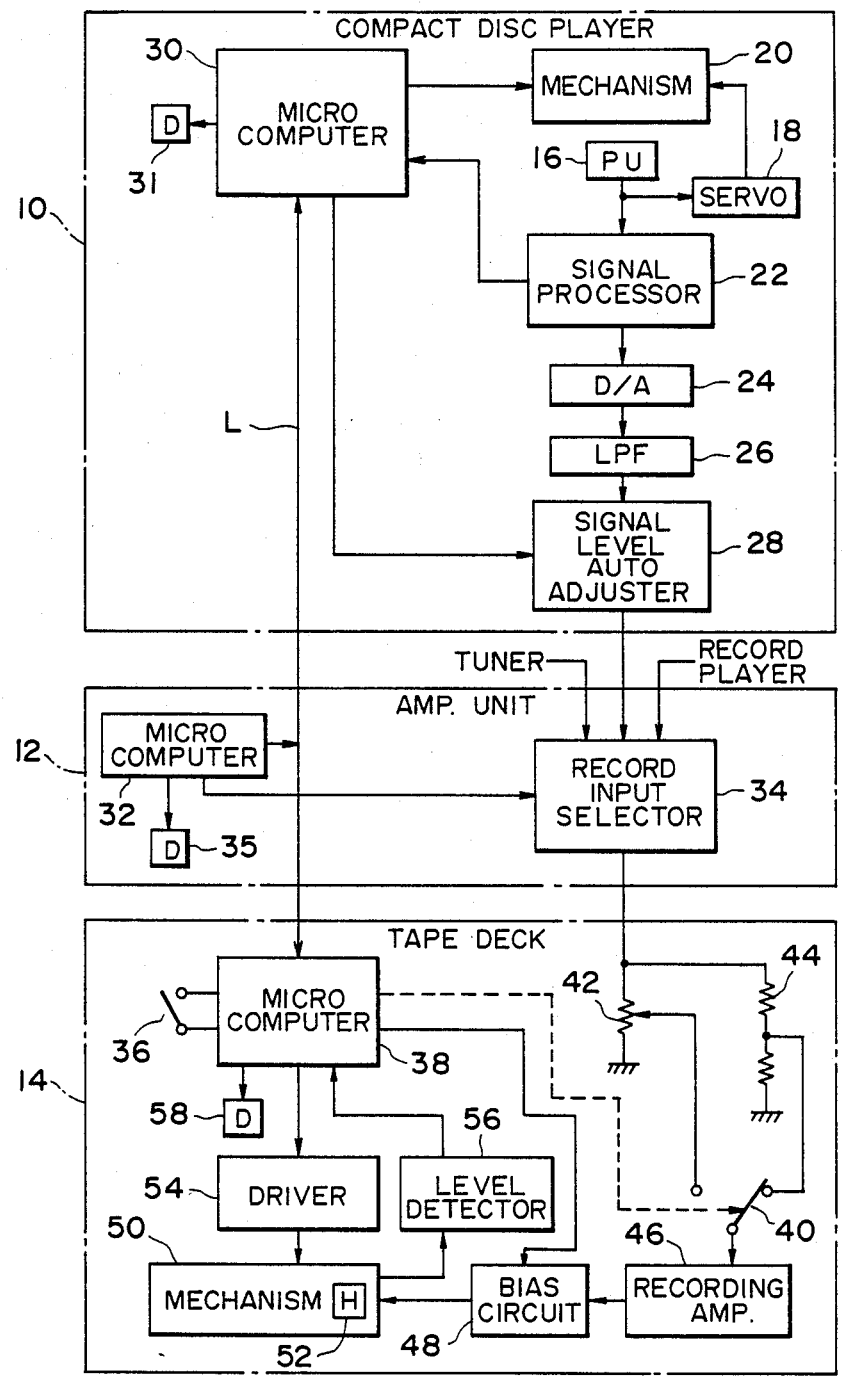
FIG. 4 is a block diagram showing an audio system to which the circuit shown in FIG. 1 applied.

FIG. 4 is a block diagram showing an audio system combined with a compact disk player 10, amplifier unit 12 and tape deck 14, wherein reproduced analog signals from the compact disk player 10 are recorded on a magnetic tape.

In the compact disk player 10, a fraction of a signal detected by an optical pickup 16 is supplied to a servo circuit 18 to feedback control a mechanism 20 including the pickup 16. A fraction of a signal from the pickup 16 is also supplied to a signal processor 22 to reproduce clock pulses, demodulate EFM codes, error correct and so on for the reproduction of audio digital data. The data is passed to a D/A converter 24 and low-pass filter 26 to obtain an original audio analog signal which is then supplied to a signal level automatic adjuster 28.

Responsive to signals from the signal processor 22 and instructions from the bilateral transfer line L, a microcomputer 30 performs various controls of the mechanism 20 and supplies a sampling instruction to the signal level automatic adjuster 28.

The signal level automatic adjuster 28 receives a sampling instruction to adjust the output level of the compact disk player 10 and obtain an optimum recording input level to the tape deck 14. For the adjustment, the mechanism 20 responsive to a control signal from the microcomputer 30 samples the analog audio signal, for example, of the first to third programs each for 15 seconds starting from the time 60 seconds before each program end.

In the amplifier unit 12, a record input selector 34 responsive to a control signal from a microcomputer 32 is switched to supply an audio analog signal (reproduced audio output signal) from the signal level automatic adjuster 28 to a record input terminal of the tape deck 14.

In the tape deck 14, when a CCRS (computer controlled compact disk recording system) switch 36 is turned on, a microcomputer 38 supplies an automatic level adjustment record instruction via the bilateral transfer line L to the microcomputers 30 and 32. Based on this instruction, the above sampling operation and the switching operation of the record input selector 34 are effected.

Connected to the record input terminal of the tape deck 14 is a parallel combination of a record sensitivity rheostat 42 and a fixed record sensitivity resistor 44 which are selectively connected to an input terminal of a recording amplifier 46 by means of a switch 40. When the CCRS switch 36 is turned on, a fixed record sensitivity instruction is outputted from the microcomputer 38. In response to this instruction, the movable contact of the switch 40 is connected to the fixed record sensitivity resistor 44 to thereby fix the record sensitivity.

With the operation of the switch 40 and with the reproduced signal level adjustment by the signal level automatic adjuster 28, it is possible to supply an audio signal most suitable for the recording amplifier 46.

The audio signal supplied to the recording amplifier 46 is superposed with a high frequency current at an AC bias circuit 48, the AC superposed audio signal being then supplied to a head 52 constituting a part of a mechanism 50. The AC bias circuit 48 includes a test tone generator for supplying a test tone signal to the head 52 while a bias current is changed in response to a bias adjustment instruction from the microcomputer 38 when the CCRS switch 36 is turned on. During a supply of a test tone signal, the tape deck 14 is in a record mode with the mechanism 50 being driven by the driver 54 in response to a control signal from the microcomputer 38. After recording the test tone signal, a magnetic tape is automatically wound backward. Then, the recorded test tone signal is reproduced to detect the reproduced test tone signal level by an output level detector 56 and to supply it to the microcomputer 38. The microcomputer 38 decides an optimum bias, based on the detected test tone level, test tone frequency and bias current at that time, and supplies a control signal to the AC bias circuit 48 to automatically adjust the bias current to the optimum bias current.

Thus, without cumbersome manipulations, a more optimum recording is ensured due to the automatic bias adjustment together with the above-described reproduced signal level automatic adjustment.

In the following description, such an automatic adjustment recording is referred to as a CCRS recording to distinguish it from a usual manual adjustment recording.

The signal level automatic adjuster 28 may be mounted on the amplifier unit 12 or on the tape deck 14.

A record preparation time required for an optimum recording after the CCRS switch was turned on, takes 60 seconds for example. After completion of such record preparation, the audio signal recorded on the compact disk can be recorded on a magnetic tape.

For the display of operation status of the compact disk player 10, amplifier unit 12 and tape deck 14, each microcomputer 30, 32 and 38 supplies a display signal to a corresponding display unit 31, 35 and 38.

Operation Display

Figure 5A:
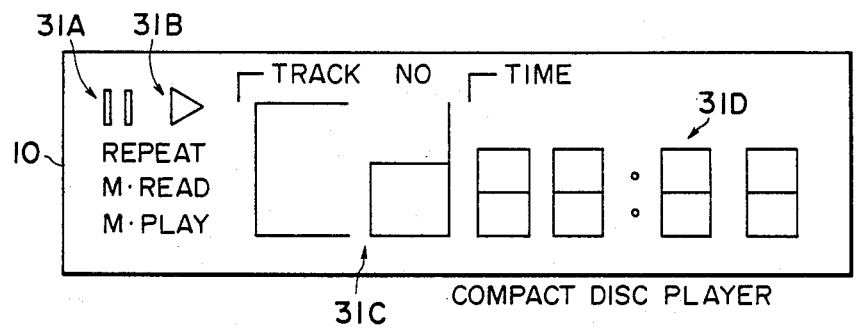
FIGS. 5A to 5C show the arrangement of displays mounted on the front panels of the devices of the audio system shown in FIG. 5.
Figure 5B:
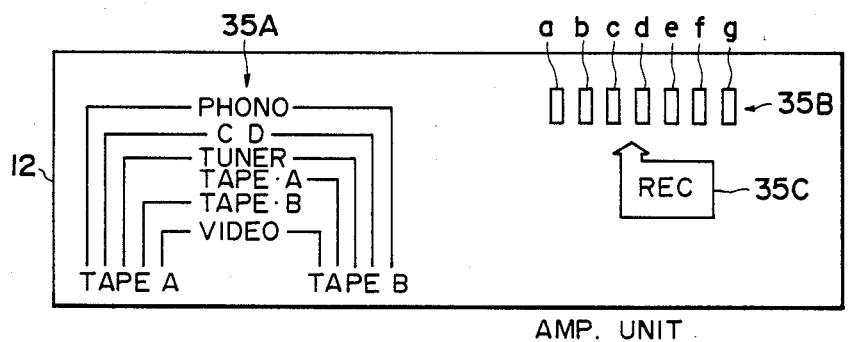
Figure 5C:
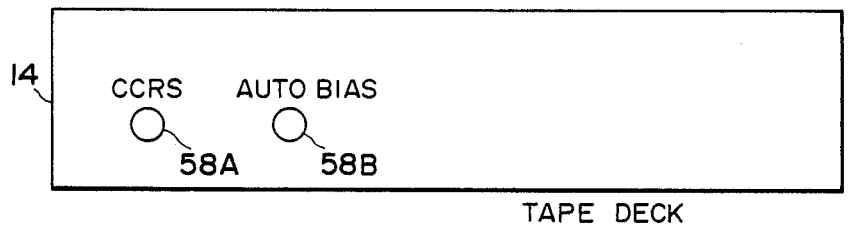

FIGS. 5A, 5B and 5C show the arrangement of displays mounted on the front panels of the compact disk player 10, amplifier unit 12 and tape deck 14.

The display unit 31 includes a pose display 31A, play display 31B, track number display 31C and time display 31D, the latter two displays being constructed of 7 segment LED's.

During the record preparation, the pose display 31A is turned on and the track number display 31 displays "Cd" as shown in FIG. 5A. During the record display and while the compact disk display 10 is sampling an audio signal recorded on the compact disk, the display "Cd" flashes. When a record status is set after the record preparation, the pose display 31A is turned off and instead the play display 31B is turned on. The track number under reproduction is displayed on the track number display 31C.

The display unit 35 includes a record output display 35A, on-record display 35B and record display 35C.

The record output display 35A is constructed of bar lamps disposed along the lines interconnecting reproduction device labels and Tape A or B label as shown in FIG. 5B, to indicate which reproduction device is operated to record a reproduced signal therefrom on a magnetic tape of Tape deck A or B. Flashing of the bar lamps indicates a CCRS recording, while on the other hand continuous turning-on indicates a common manual recording. For instance, in case where a reproduced signal from a compact disk player is being CCRS-recorded on a magnetic tape of the tape deck B, the bar lamp interconnecting the labels "CD" and "TAPE B" is flashed.

The on-record display 35B is constructed of an array of display lamps a to g. During the record preparation and the on-record, first the display lamp d alone is turned on for a preset time, next the diplay lamps c and e alone are turned on for a preset time, then the display lamps b and f, and a and g. Such illumination is repeated. While the lamps are sequentially turned on, the record display 35C is also turned on.

The display unit 58 includes, as shown in FIG. 5C, a CCRS display 58A and an automatic bias display 58B.

The CCRS display 58A flashes during the record preparation and is turned on during the on-record. The automatic bias display 58B flashes during the bias adjustment and thereafter, it is maintained turned on.

With the above display, the operation of each device can be kept notified at any time during operation. Also it is possible to clearly distinguish between operations under a CCRS recording and a usual recording.

Signal Level Auto Adjuster

Figure 1:
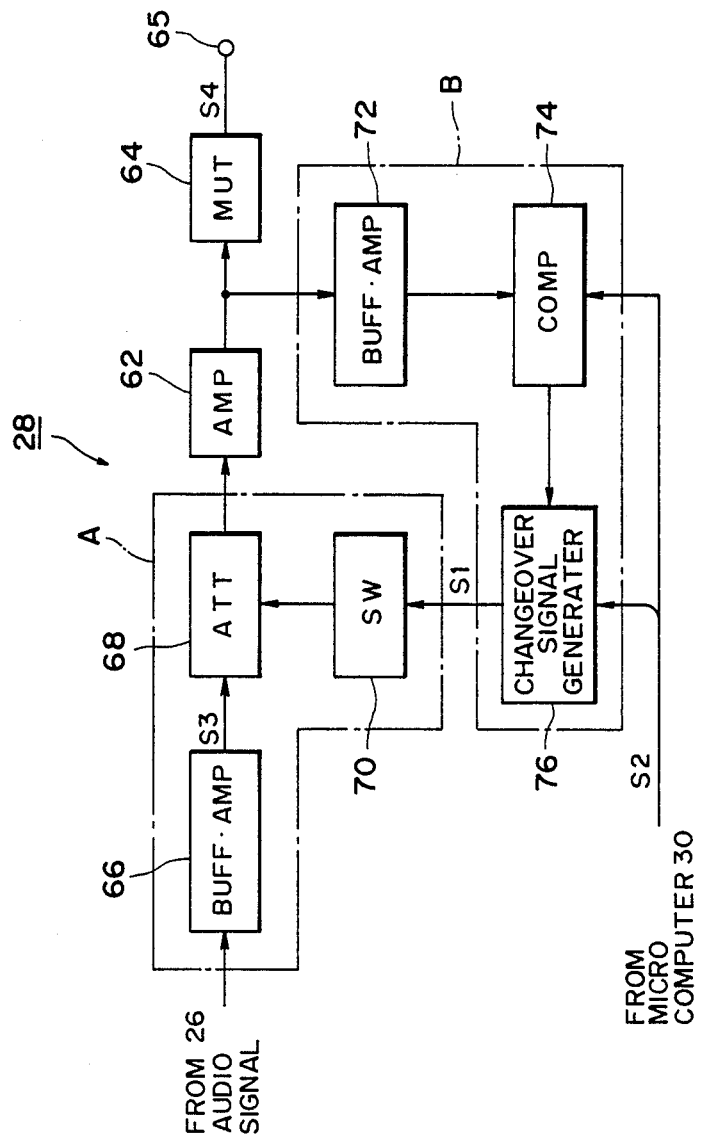
FIG. 1 is a block diagram showing an embodiment of the magnetic recording signal level automatic level adjustment device according to the present invention.
Figure 2A:
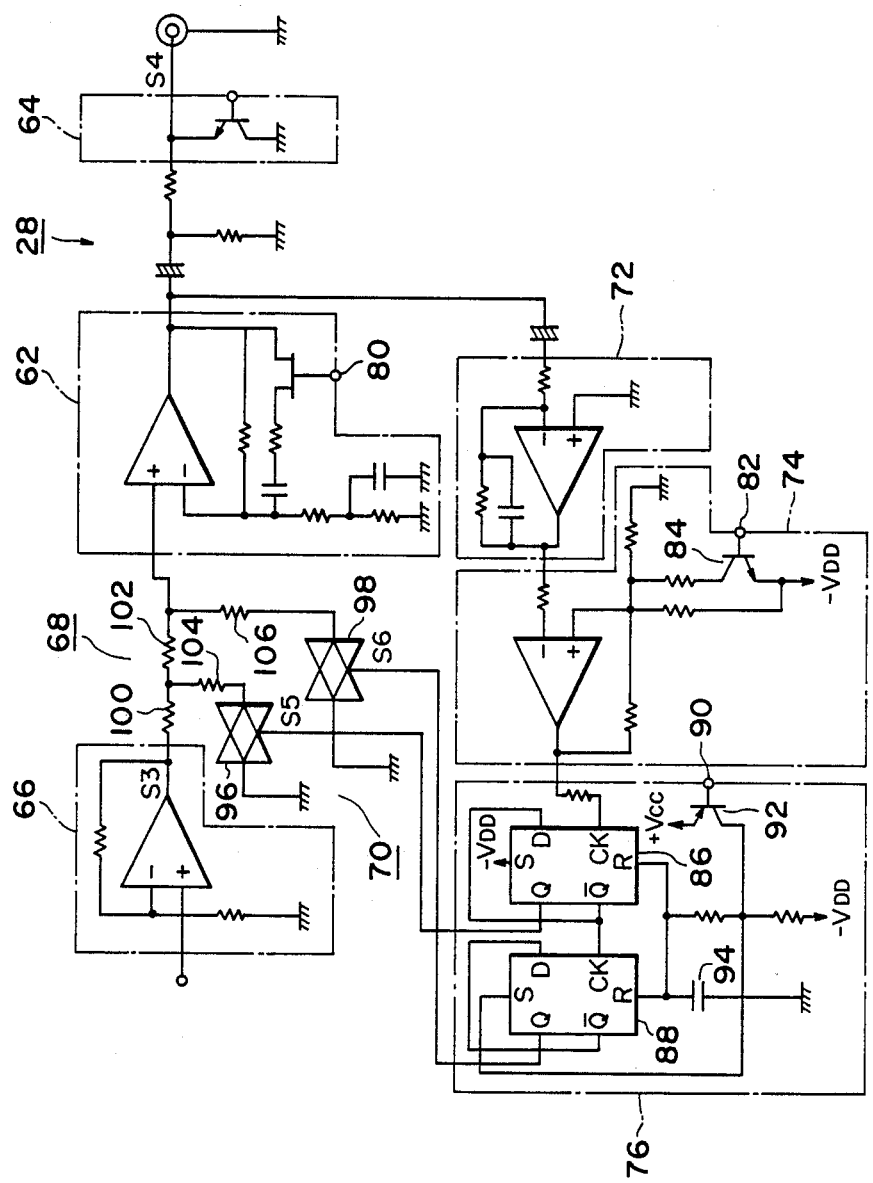
FIG. 2A is a particular circuit diagram of the device shown in FIG. 1.
Figure 2B:
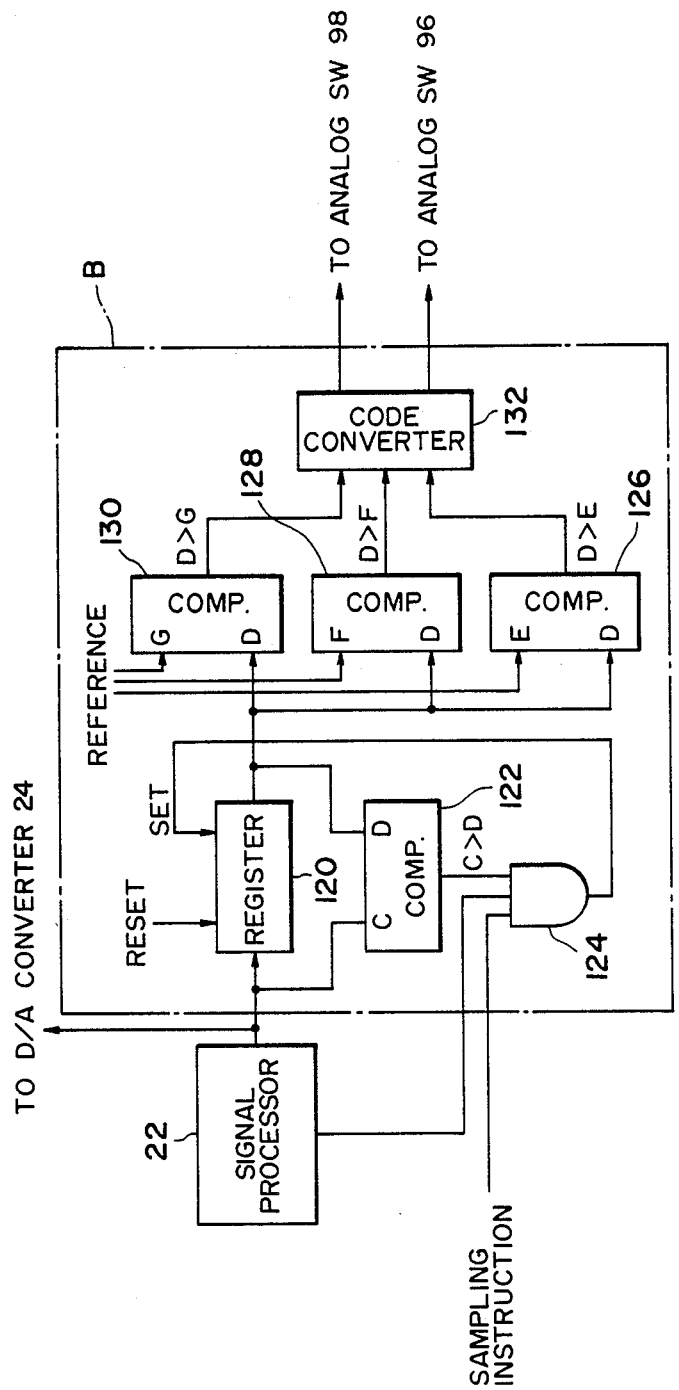
FIG. 2B is a modification of the circuit diagram of the device shown in FIG. 1.

The signal level automatic adjuster 28 shown in FIG. 4 will be described more in detail with reference to FIGS. 1 to 3, wherein FIG. 1 is a detailed block diagram of the signal level automatic adjuster 28, FIGS. 2A and 2B are particular circuit diagrams of the signal level automatic adjuster 28, and FIG. 3 shows waveforms of main signals at the signal level automatic adjuster 28 shown in FIG. 2A.

As shown in FIG. 1A, a reproduced signal level attenuator A, amplifier 62 and muting circuit 64 are connected in tandem, the output terminal 65 of the muting circuit 64 being the output terminal of the compact disk player 10.

The reproduced signal level attenuator A is constructed of a buffer amplifier 66 to which an audio signal is applied from the low-pass filter 26, an attenuator 68 following the buffer amplifier 66, and a switch circuit 70 connected to a control terminal of the attenuator 68 for changing the attenuation quantity.

An attenuation controller B is constructed of a buffer amplifier 72 whose input terminal is coupled to the output terminal of the amplifier 62, a comparator 74 following the buffer amplifier 72, and a changeover signal generator 76 following the comparator 74. The output terminal of the changeover signal generator 76 is connected to the input terminal of the switch circuit 70. Control terminals of the comparator 74 and changeover signal generator 76 are connected to output control terminals of the computer 30.

In operation, when a sampling instruction S2 is supplied from the microcomputer 30 to the comparator 74 and the changeover signal generator 76, the comparator 74 is made active and the changeover signal generator 76 is made to have an initially set output value. The attenuator 68 is correspondingly initialized to have a minimum attenuation. A signal S3 outputted from the buffer amplifier 66 is attenuated by the attenuator 68 and amplified by the amplifier 62. The amplified signal is applied via the buffer amplifier 72 to the comparator 74 and compared with a reference level. If the output level from the buffer amplifier 72 is larger than the reference level, the changeover signal generator 76 outputs an attenuation change instruction S1 to the switch circuit 68 to increase the attenuation quantity by one step. As a result, the level of an output signal S4 appearing at the output tereminal 65 and the level of an input signal to the buffer amplifier 72 become lower. The reproduced signal level is further sampled and, if the comparator 74 decides that the output level of the buffer amplifier 72 is larger than the reference level, an attenuation change instruction S1 is again supplied from the chageover signal generator 76 to the switch circuit 70 so the attenuation quantity is increased by another one step.

By repeating the above operations, a maximum output signal level of the output signal S4 is set near at a predetermined level even if there are large differences in level of the recorded signals in the labels of a compact disk. Thus, it becomes possible to record audio signals of wide dynamic range on a magnetic tape without generating distortion and degrading an S/N ratio.

In the particular circuit of the signal level automatic adjuster 28 shown in FIG. 2A, the amplifier 62 and the buffer amplifier 66 are constructed of non-inverted operational amplifier, whereas the buffer amplifier 72 is constructed of an inverted operational amplifier. The amplifier 62 is provided with a deemphasis control terminal 80 for use in attenuating high frequency components. The comparator 74 is a Schmitt trigger circuit made of an operational amplifier. When a transistor 84 is turned off with a low level applied to its control terminal 82, the reference level is made so high that the operation of the comparator 74 is substantially stopped. When the transistor 84 is turned on with a high level applied to the control terminal 82, the reference level is lowered to such a value suitable for operation of the comparator 74.

The changeover signal generator 76 is constructed of a 2-bit binary counter made of D-type flip-flops 86 and 88, which counter counts the positive edge of an output voltage from the comparator 74. When a transistor is turned on with a low level applied to its control terminal 90, the D-type flip-flop 88 is set and after a preset time, a capacitor 94 is charged to reset both the D-type flip-flops 86 and 88 with the Q output terminals of the D-type flip-flops 86 and 88 maintained low level.

The switch circuit 70 is constructed of analog switches 96 and 98, and the attenuator 68 is constructed of four resistors 100, 102, 104 and 106.

In operation, when the microcomputer causes the control terminal 82 high level and the control terminal 90 low level, i.e., when the computer 30 supplies a sampling instruction, signal S5 becomes low level whereas signal S6 maintains high level for a certain time and thereafter, it becomes low level. When both the signals S5 and S6 become low level, both the analog switches S5 and S6 are turned off so that the attenuation quantity of the attenuator 68 becomes a minimum, for example, +8 dB up from an ordinary signal level.

In this condition, if an audio signal larger than a predetermined value is applied to the input terminal of the buffer amplifier 66, the counter of the changeover signal generator 76 counts up to make the signal S5 high level. As a result, the analog switch 96 is turned on to make the attenuation quantity of the attenuator 68 larger by one step, resulting in the attenuation quantity of, for example, +4 dB. If the output level at the amplifier 62 becomes larger than a predetermined value even at the attenuation quantity of +4 dB, the counter of the changeover signal generator 76 again counts up to make the signal S5 low level and the signal S6 high level. Consequently, the analog switches 96 and 98 are turned off and on, respectively. Then, the attenuation quantity of the attenuator 68 is further increased to, for example, 0 dB (this corresponds to the above-described ordinary signal level). Similarly, if the output level at the amplifier 62 further becomes larger than a predetermined level, the signals S5 and S6 become high level to turn off the analog switches 96 and 98. Thus, the attenuation quantity of the attenuator 68 is further increased to, for example, −4 dB.

The values of resistors of the attenuator 68 are decided such that when an audio signal of an ordinary level is applied to the input terminal of the buffer amplifier 66, the counter of the changeover signal generator 76 should not count up.

Upon completion of the sampling operation, the control terminals 82 and 90 are made low and high levels, respectively. Thus, the comparator 74 is made disabled. Therefore, the count of the changeover signal generator 76 as well as the attenuation quantity of the attenuator 68 is retained as it is.

Another particular circuit of the signal level automatic adjuster 28 will be described with reference to FIG. 2B.

The attenuation controller B of the signal level automatic adjuster 28 of this circuit is constructed of digital circuits. Audio digital data outputted from the signal processor 22 shown in FIG. 4 supplied to a register 120 and a digital comparator 122. If the audio digital data has a larger value than that previously stored in the register 120, a clock pulse outputted from the signal processor 22 in synchro with the output of the audio digital data is applied to an AND gate 124 to thereby set the register and renew the value of the register 120. With such operation, a maximum peak level of the audio digital data during the sampling operation is loaded in the register 120. This maximum peak level D is compared with reference values E, F and G (E<F<G) by comparators 126, 128 and 130, respectively. The results are code-converted by a code convertor 132 to generate the above-descried signals S5 and S6 which are applied to the control terminals of the analog switches 96 and 98 shown in FIG. 2A.

In FIG. 2B, the AND gate 124 is opened when a sampling instruction (high level), a clock pulse and an output from the comparator 122 are supplied at a time. The register 120 is reset at the positive edge of a sampling instruction and the content thereof is made null.

The number of attenuation steps may be two or more. Instead of stepwise change, the attenuation quantity may be changed linearly by using as the attenuator a rheostat, for example, which is driven with a motor by an amount corresponding to a value stored in the register 120. In this case, the comparators 126 to 130 are not needed because the difference among the reference levels E, F and G is zero in case of linear attenuation change.

Further, although the attenuation controller B has been constructed of hardware in the above embodiments, it may obviously be constructed of software.

Procedure for Recording Preparation

Next, a part of the software structure of the microcomputers 30 and 38 will described.

Figures 1, 6:
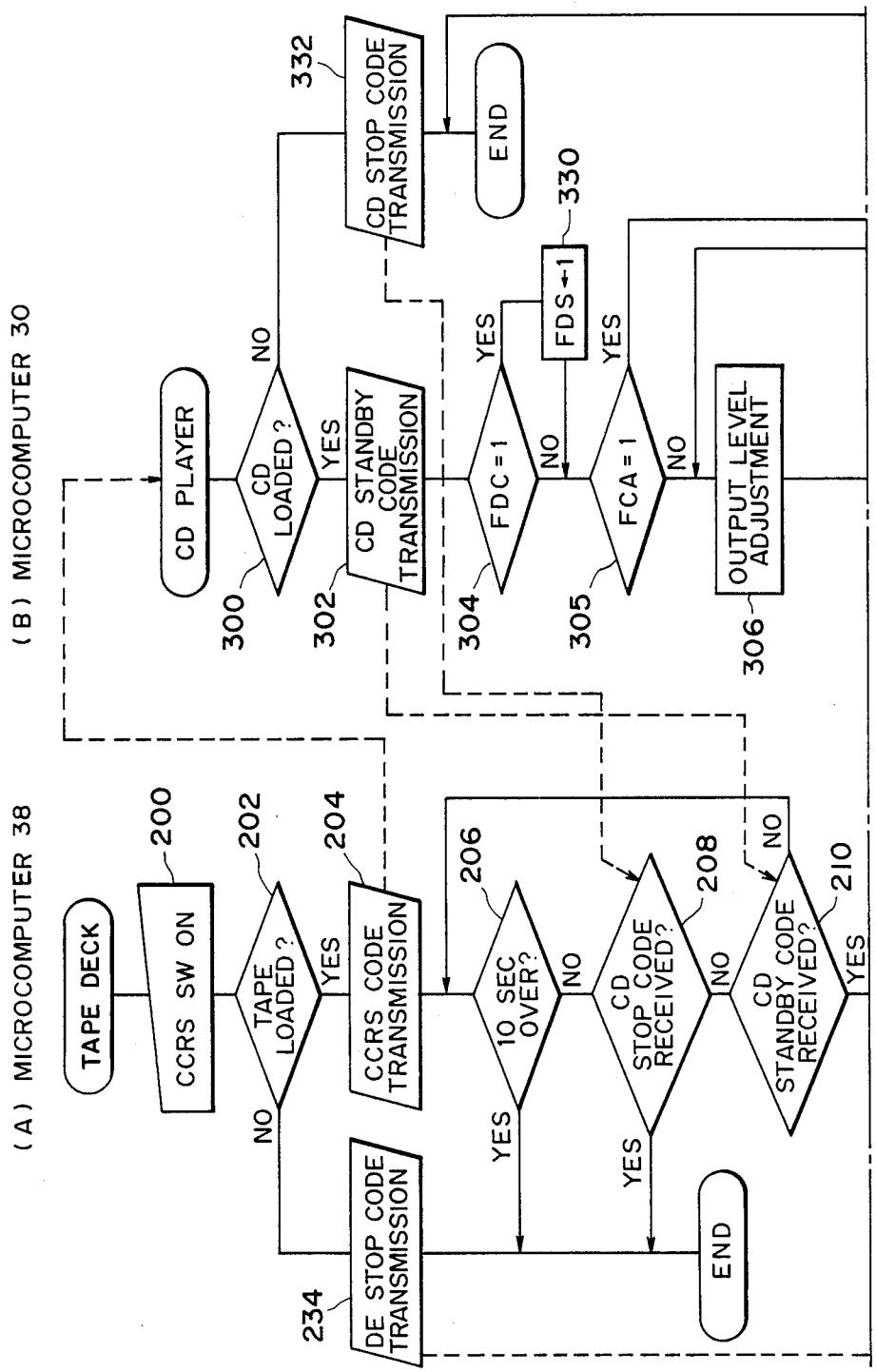
FIG. 6 shows the arrangement of FIGS. 6-1 to 6-3 how the Figures are formed in a single drawing.

FIGS. 6-1 to 6-3 show the recording preparation processing, wherein the flow charts on (A) and (B) sides are for the microcomputers 38 and 30, respectively. FIGS. 7-1 and 7-2 show the detailed flow charts for steps 306 to 314 in FIG. 6-2 on the (B) side.

The processing performed in an ordinary case, i.e., under condition that the time required for an output signal level adjustment is longer than that for a bias level adjustment. After the CCRS switch 36 is turned on at step 200, the flow advances to step 202 whereat it is checked if a magnetic tape has been loaded in the mechanism 50. If a magnetic tape is loaded, the flow advances to step 204 whereat a CCRS code is transmitted to the microcomputer 30. Upon reception of the CCRS code by the microcomputer 30, the flow shown in FIGS. 6-1 to 6-3 on the (B) side starts.

Particularly, it is checked at step 300 if a compact disk has been loaded in the mechanism 20. If loaded, the flow advances to step 302 whereat a compact disk (CD) standby code is transmitted to the microcomputer 38. After steps 206 and 208 on the (A) side, the microcomputer 38 receives the CD standby code at step 210. By this time, a compact disk player preparation completion flag FCC and a tape deck bias adjustment completion flag FDB have already been reset at an initializing routine when the power of the microcomputer 38 was turned on. The flow then advances to steps 211, 212 and 214 whereat& the microcomputer 38 gives a control signal to the driver 54 and the AC bias circuit 48 to read a test tone level from the output level detector 56, to accordingly perform an AC bias automatic adjustment. Next, the flow advances to steps 216 and 220. If the bias adjustment is not completed at step 220, the flow returns to step 214. If completed, a tape deck bias adjustment completion flag FDB is set at step 221 and thereafter, at step 222 a tape deck (DE) standby code is transmitted to the microcomputer 30.

A tape deck preparation completion flag FDC and a compact disk output signal level adjustment completion flag FCA have already been reset at the initializing routine when the power of the microcomputer 30 was turned on. The flow advances to steps 304, 305 and 306 whereat the microcomputer 30 gives a sampling instruction to the signal level automatic adjuster 28 to adjust the output signal level. Next, the flow advances to steps 308 and 310. If a DE standby code is not received from the microcomputer 38 at step 310, the flow advances to step 314. If the output signal level adjustment is not completed at step 314, the flow returns to step 306 to repeat the above processing. If a DE standby code is received from the mcrocomputeer 38 at step 310, the flow advances to step 312 whereat a tape deck standy flag FDS is set. After completion of the output level adjustment, the flow advances from step 314 to step 315 whereat the compact disk player output signal level adjustment flag FCA is set and thereafter, the microcomputer 30 transmits at step 316 a CD standby code to the microcomputer 38.

In an ordinary case, the process at step 218 is not performed by the microprocessor 38 after step 216, so that the flow advances to step 224 and hence step 226 whereat a CD standby code from the microporcessor 30 is waited for. Upon reception of this code, step 228 follows whereat the compact disk player preparation completion flag FCC is set, whereas a compact disk player standby flag FCS is reset. After the switch is connected to the fixed recording sensitivity resistor 44 at step 229, recording of the reproduced signal from the compact disk starts at step 230. Since the tape deck standby flag FDS was set at step 312, the flow advances to steps 318 and 324 whereat the tape deck preparation completion and a tape deck standby flag FDS are reset. Next, at step 326 the flow stops for a predetermined time in order to prevent the compact disk from being played before the process of step 230. The compact disk starts playing at step 328.

Next, in case where the time required for the bias adjustment of the tape deck 14 is longer than that required for the output signal level adjustment of the compact disk player 10, the micropomputer 38 receives at step 216 a CD standby code from the microcomputer 38. Then at step 218, the compact disk player standby flag FCS is set. Therefore, the decision at step 224 is affirmative so that the flow advances directly to steps 228, 229 and 230.

Since a tape deck standby code was not received at step 310 and the tape deck standby flag FDS was reset, the decision at step 318 is negative so that a tape deck standby code is waited for at step 320.

The compact disk player preparation completion flag FCC and the compact disk player output signal level adjustment completion flag FCA remain at set status unless the compact disk is replaced with a different one. For instance, in case where the CCRS switch 36 is again turned on after a temporal stop of recording, it is not necessary for the bias adjustment and the output signal level adjustment to be performed again. In such a case, the adjustment is not performed because of set status of the flags FCC and FCA.

Particularly, since the decision at step 212 is affirmative, the flow skips to step 222. The process at step 226 is also passed to immediately start recording without waiting for a DE standby code. Similarly, since the decision at step 304 is affirmative, the tape deck standby flag FDS is set at step 330. Therefore, after step 318, the flow skips to step 324 to immediately re-start playing the compact disk without waiting for a DE standby code.

It is noted here that if a compact disk is changed, the compact disk player preparation completion flag FCC and the compact disk player signal level adjustment completion flag FCA are reset by another routine (not shown).

If a magnetic tape is changed while using a same compact disk during recording, the tape deck preparation completion flag FDC and the tape deck bias adjustment completion flag FDB are reset by another routine (not shown).

Alternatively, if the decision at step 202 is negative because a magnetic tape is not loaded in the mechanism 50, the microcomputer transmits at step 234 a DE stop code to the microcomputer 30. Upon reception of a DE stop code by the microcomputer 30 at step 308 or 322, the processes are stopped without playing the compact disk. Similarly, if the decision at step 300 is negative because a compact disk is not loaded in the mechanism 20, the microcomputer 30 transmits at step 332 a CD stop code to the mcrocomputer 38. Upon reception of a CD stop code by the microcomputer 38 at step 208, the bias adjustment as well as the recording processing is not performed.

If the power of the compact disk player 10 is not supplied or if the microcomputers 30 and 38 are not interconnected by the bilateral transfer line L, the microcomputers 38 cannot receive a CD standby code and so it repeats the processes at steps 206 to 210 and after 10 seconds step 206 stops the recording processing without performing a bias adjustment.

Output Signal Level Auto Adjustment

Next, the output signal level adjustment (steps 306 tp 314) will be detailed with reference to FIG. 7.

It is here assumed that the number $TK_1$ of total music programs to be recorded on a magnetic tape has been set by the compact disk player 10.

At step 400, the value of N-th program is set at 1. Next, if the number TK of total programs to be recorded is 3 or more at step 402, the flow advances to step 404 whereat the sampling time $T_2$ for one program is set at 15 seconds and the value TK is set at 3. Next at step 406 it is checked if the N-th program play time is over one minute. If affirmative, sampling from a time one minte ($T_1$) before the start point of (N+1)-th program starts at step 408. By this sampling, the output signal level automatic adjustment is carried out using the hardware structure as described previously. Next, the processes at steps 308 to 312 shown in FIG. 7-2 similar to those in FIG. 6-2 on the (B) side are performed. If it is judged at step 416 that $T_2$ second has not lapsed after the start of sampling and that the track number under sampling operation has not changed at step 418, the flow advances to step 419 to continue the sampling operation and return to step 308 to repeat the above processing.

If $T_2$ has lapsed after the start of sampling and the track number has changed after or before the lapse of $T_2$, the flow advances to step 420 whereat the value N is incremented by one. At next step 422 the values of N and TK are compared with each other and if N is smaller than TK, i.e., if the number of sampled programs is two or less, the flow returns to step 406 to repeat the above processing. If N is equal to TK, the sampling operation stops and step 316 resumes.

If the number of total programs (TK) to be recorded is 2, step 402 is followed by steps 424 and 426 whereat the sampling time $T_2$ for one program is set, for example, at 20 seconds. In this case, the two programs are sampled at $TK_1=2$. If the number of total programs to be recorded is 1, step 402 is followed by steps 424, 428 and 430 whereat the sampling time $T_2$ for one program is set, for example, at 32 seconds and the sampling is conducted for one program at $TK_1=1$.

If there is no program to be recorded, obviously the sampling operation is not necessary. Therefore, in this case, step 402 is followed by steps 424, 428 and 432 whereat the microcomputer 30 transmits a CD stop code to the microcomputer 30. Upon reception of this code by the latter (at step 208), the recording stops.

Although the above adjustment operation can obtain a very high probability particularly for polular music programs, the additional sampling at the final movement is preferable to improve the probability of the maximum peak level estimation, particularly for classic music which is played our several movements.

Figures 2, 6:
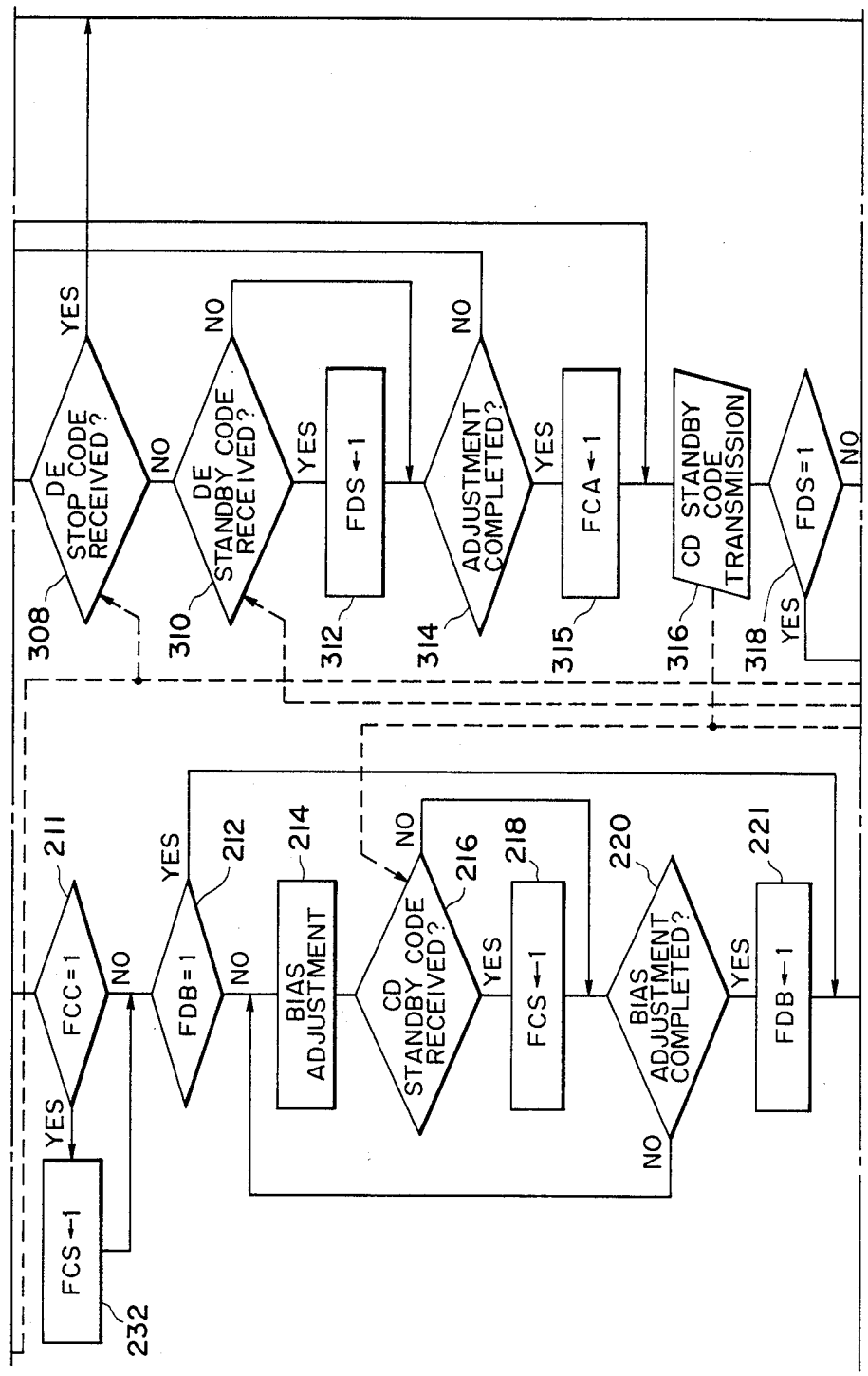
Figures 1, 7A:
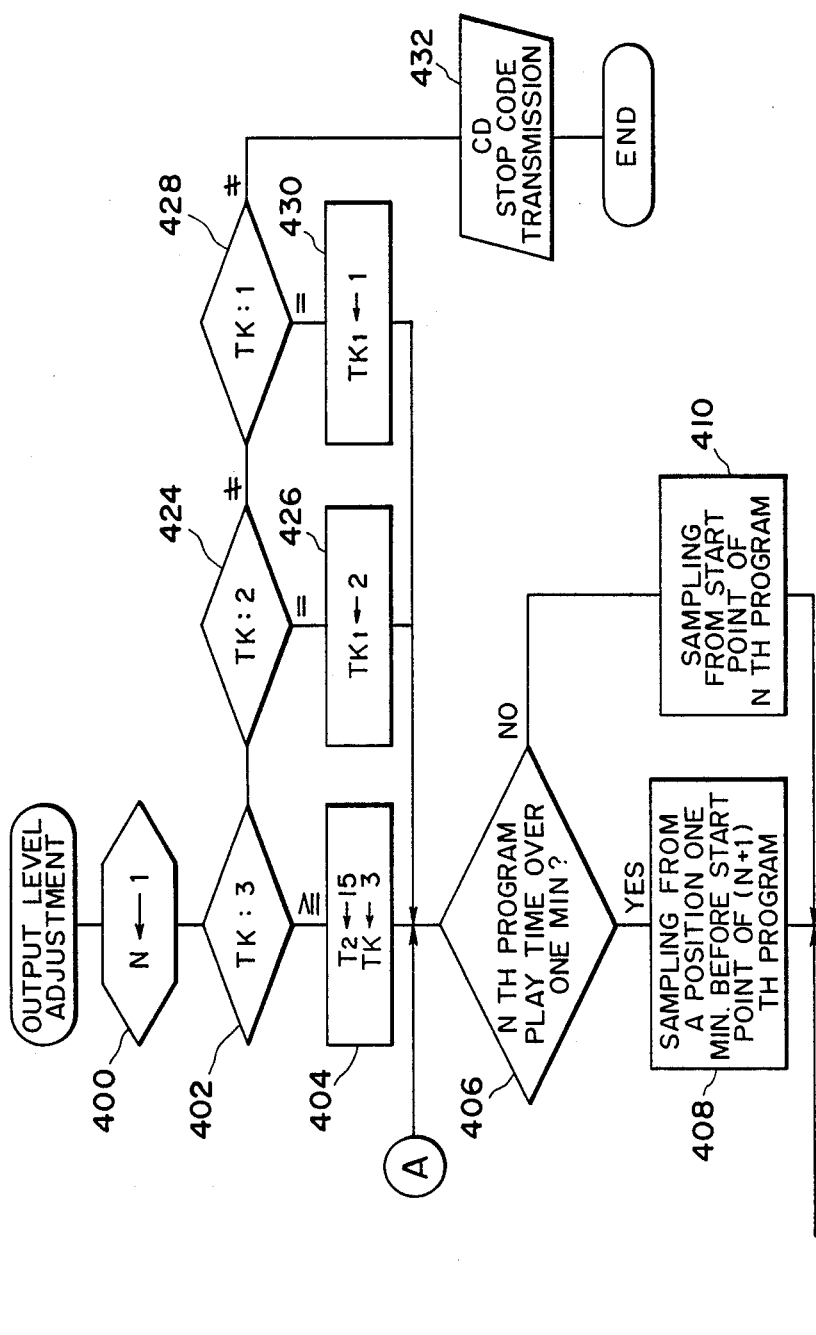
Figure 7B:
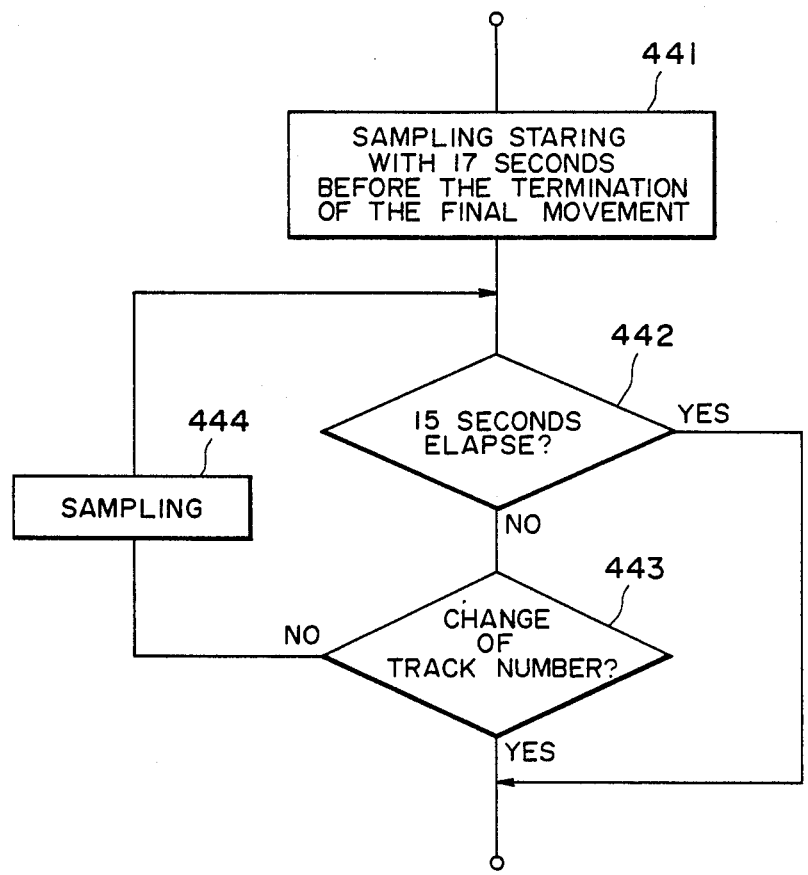
FIG. 7B is a flow chart illustrating additional sampling procedure according to the invention.

This additional sampling step for the final movement is realized by adding steps to step 422 in the flow of FIG. 7-2. The details of additional step are shown in FIG. 7B. As shown in FIG. 7B, the sampling starts with 17 seconds before the termination of the final movement (step 441) and continues for 15 seconds (step 442) or until the change of a track number (step 443). Then the flow returns to step 316.

In the above embodiment, although the output signal level automatic adjustment is performed collectively for all the programs in the compact disk player 10 to be recorded, each program may be sampled independently and its output signal level be automatically adjusted separately.

Further, if the attenuation quantity of the attenuator 68 is set at a maximum in the course of the sampling operation, the remaining sampling operation may be stopped to reduce the total sampling time.

Furthermore, an automatic mode and a manual mode may be provided for the CCRS recording mode. In the automatic mode, $T_1$ and $T_2$ are set in the similar manner as above. In the manual mode, a setting device is used for setting $T_1$ and $T_2$ in accordance with whether the enough recording preparation time can be used or the type of program. Still further, the number of sampling programs may be set in the manual mode.

Accordingly to the magnetic tape recording signal level automatic adjustment device of this invention, during sampling a reproduced signal from a PCM audio signal reproduction device, if the reproduced signal level becomes in excess of the reference value, the attenuation quantity is set in accordance with the reproduced level. After the sampling operation, the attenuation quantity is fixed. Therefore, a maximum value of the reproduced signal during the sampling is set substantially at a predetermined level. Thus, even if there are differences among recording levels in the labels or programs of a PCM audio signal recording medium, the reproduced signal level can be adjusted automatically and properly by setting an appropriate sampling instruction.

It is advantageous in that the signal level automatic adjustment device can record the original signals with fidelity and little distortion, and improve the S/N ratio, without narrowing the dynamic range.

According to the magnetic tape recording signal level automatic adjustment method of this invention, the reproduced signal level from a PCM audio signal reproduction device is sampled, in accordance with a statistical analysis result, at the region where there is a high probability of including a maximum level among all the levels of a program to be recorded on a magnetic tape. The sampled maximum level is assumed as a maximum level among all the levels of the program.

Therefore, it is possible to assume a maximum level in short time and automatically adjust the reproduced signal level of the PCM audio signal reproduction device to an optimum value, using the estimated maximum value.

According to the audio system of this invention, the system control means gives a sampling instruction S2 to the signal level automatic adjuster means and a fixed recording sensitivity instruction to the tape recorder. Then, the signal level automatic adjuster means samples the reproduced signal from the PCM audio signal reproduction device. If the reproduced signal level becomes in excess of the reference value, the attenuation quantity is set in accordance with the reproduced level. After the sampling operation, the attenuation quantity is fixed. Thus, a maximum value of the reproduced signal during the sampling is set substantially at a predetermined level. Meanwhile the recording sensitivity of the tape recorder is maintained fixed at a predetermined value. As a result, even if there are differences among recording levels in the labels or programs of a PCM audio signal recording medium, the reproduced signal level can be adjusted automatically and properly without cumbersome manipulations, to thereby record the audio analog signal on a magnetic tape.

Further, it is advantageous in that the audio system can record the original signals with fidelity and little distortion, and improve the S/N ratio, without narrowing the dynamic range.

In addition, the displays for distinguishably displaying the recording preparation operation and its completion operation are provided. Therefore, advantageously the operator can distinguish among the cases where the reproduced signal level is under automatic adjustment, the automatic adjustment is completed, a normal recording without an automatic adjustment is being carried out, or no operation is being carried out because of some failure.

In the above mentioned recording signal level automatic adjustment apparatus, the sampling starts with reproduction time $T_1$ before the end of a program recorded in PCM audio recording medium. The same effect can be obtained by starting the sampling with a certain time before the beginning of the next program. In compact disc players, a memory called TOC (table of contents) stores the beginning (start point) data of each program. Accordingly, when starting the sample with a cetain time before the beginning of the next program, the stored beginning data in the TOC is used. In addition, since the total number of programs is stored in the TOC, it is possible to identify a program by using such information.

What is claimed is:

1. A magnetic tape recording signal level automatic adjustment method comprising the steps of:
   sampling the reproduced signal level of an audio signal reproduction device for a time period $T_2$ which starts at a time $T_1$ before the end or the vicinity of the end of a program recorded on an audio signal recording medium;
   assuming the maximum value of said sampled, reproduced signal level as the maximum value of reproduced signals during the entire portion of said program to be recorded on a magnetic tape; and
   adjusting said sampled, reproduced signal level so that the maximum value of said sampled, reproduced signal level becomes substantially a predetermined value.

2. A method according to claim 1, wherein said time $T_1$ is about 60 seconds, and said time $T_2$ is about 15 seconds.

3. A method according to claim 1, wherein the number of programs to be sampled from TK programs is TK if the number of programs (TK) to be recorded into the magnetic tape is smaller than 2 and at least 3 if larger than 3.

4. A method according to claim 1, wherein said sampling is performed for such a program requiring a minimum access time of a pickup, which reads data recorded in said PCM audio signal recording medium, to the sample start position.

5. A method according to claim 4, wherein said time $T_1$ is about 60 seconds, and said time $T_2$ is longer than 15 seconds, respectively for the number of programs (TK) to be recorded into the magnetic tape is smaller than 3.

6. A method according to claim 1, wherein said audio signal recording medium has a plurality of a programs recorded thereon including a final program and where the sampling is further conducted for the final program recorded on the audio signal recording medium.

7. A method according to claim 6, herein said further sampling for the final program is conducted under time $T_1 = 17$ seconds and time $T_2 = 15$ seconds.

8. A magnetic tape recording level automatic adjustment method comprising the steps of:
   indicating a type of music program to be reproduced;
   sampling the reproduced signal level for a time period which is predetermined as a part of the music program according to the indicated type of music program;
   assuming the maximum value of said sampled, reproduced signal level as the maximum value of reproduced signals during the entire portion of said program to be recorded on a magnetic tape and previously adjusting said sampled, reproduced signal level by setting an attenuator so that the maximum level of said sampled, reproduced signal level becomes substantially a predetermined value and,
   recording the reproduced signal through the previously set attenuator.

9. A method according to claim 8, wherein the number of programs to be sampled from TK programs is TK if the number of programs (TK) to be recorded into the magnetic tape is smaller than 2 and at least 3 if larger than 3.

10. A method according to claim 8, wherein said sampling is performed for such a program requiring a minimum access time of a pickup, which reads data recorded in said PCM audio signal recording medium, to the sample start position.

11. A method according to claim 8, wherein the sampling is further conducted for the final program recorded in the audio signal recording medium.

12. Apparatus according to claim 8, wherein the number of programs to be sampled from TK programs is TK if the number of programs (TK) to be recorded into the magnetic tape is smaller than 2 and at least 3 if larger than 3.

13. Apparatus according to claim 8, wherein said sampling is performed for such a program requiring a minimum access time of a pickup, which reads data recorded in said PCM audio signal recording medium, to the sample start position.

14. Apparatus according to claim 8, wherein the sampling is further conducted for the final program recorded in he audio signal recording medium.

15. Magnetic tape recording signal level automatic adjustment apparatus comprising:
   means for sampling the reproduced signal level of an audio signal reproduction device for a time period $T_2$ which starts from a time $T_1$ before the end or the vicinity of the end of a program recorded on a PCM audio signal recording medium, and
   means assuming the maximum value of said sampled, reproduced signal level as a maximum value of reproduced signals during the entire portion of said program to be recorded on a magnetic tape and adjusting said sampled, reproduced signal level so that the maximum value of said sampled, reproduced signal level becomes substantially a predetermined value.

16. Apparatus according to claim 15, wherein said time $T_1$ is about 60 seconds, and said time $T_2$ is about 15 seconds.

17. Apparatus according to claim 15, wherein the number of programs to be sampled from TK programs is TK if the number of programs (TK) to be recorded into the magnetic tape is smaller than 2 and at least 3 if larger than 3.

18. Apparatus according to claim 15, wherein said sampling is performed for such a program requiring a minimum access time of a pickup, which reads data recorded in said audio signal recording medium, to the sample start position.

19. Apparatus according to claim 18, wherein said time $T_1$ is about 60 seconds, and said time $T_2$ is longer than 15 seconds, respectively for the number of programs (TK) to be recorded into the magnetic tape is smaller than 3.

20. Apparatus according to claim 15, wherein the sampling is further conducted for the final program recorded in the audio signal recording medium.

21. A magnetic tape recording level automatic adjustment apparatus comprising the steps of:
   means for indicating a type of music program to be reproduced;
   means for sampling the reproduced signal level for a time period which is predetermined as a part of the music program according to the indicated type of music program;
   means for assuming the maximum value of said sampled, reproduced signal level as the maximum value of reproduced signals during the entire portion of said program to be recorded on a magnetic tape and previously adjusting said sampled, reproduced signal level by setting an attenuator so that the maximum value of said sampled, reproduced signal level becomes substantially a predetermined value and,
   means for recording the reproduced signal through the previously set attenuator.

* * * * *